United States Patent [19]

Tabone

[11] Patent Number: 5,146,525
[45] Date of Patent: Sep. 8, 1992

[54] FIBER OPTIC PLUG CONNECTOR HAVING OPTICAL CENTER ADJUSTMENT MEANS

[75] Inventor: Peter P. Tabone, Kings Park, N.Y.

[73] Assignee: Porta Systems Corp., Syosset, N.Y.

[21] Appl. No.: 754,071

[22] Filed: Sep. 3, 1991

[51] Int. Cl.$^5$ .............................................. G02B 6/36
[52] U.S. Cl. ........................................ 385/78; 385/76
[58] Field of Search ................................. 385/76–81, 385/86, 87

[56] References Cited

U.S. PATENT DOCUMENTS

| 4,798,433 | 1/1989 | Irvin et al. | 385/78 |
| 5,074,636 | 12/1991 | Hopper | 385/76 |
| 5,096,276 | 3/1992 | Gerace et al. | 385/76 |

Primary Examiner—John D. Lee
Attorney, Agent, or Firm—Charles E. Temko

[57] ABSTRACT

A fiber optic plug connector incorporating an adjustable keying means for maintaining a specific relative adjustment between the engaged fiber optic cable and the body of the connector which is not disturbed by removal and reconnection to a corresponding plug. The construction includes an adjusting tool which provides for rotational increments of adjustment which cannot be accidentally altered once the adjusting tool is removed.

2 Claims, 6 Drawing Sheets

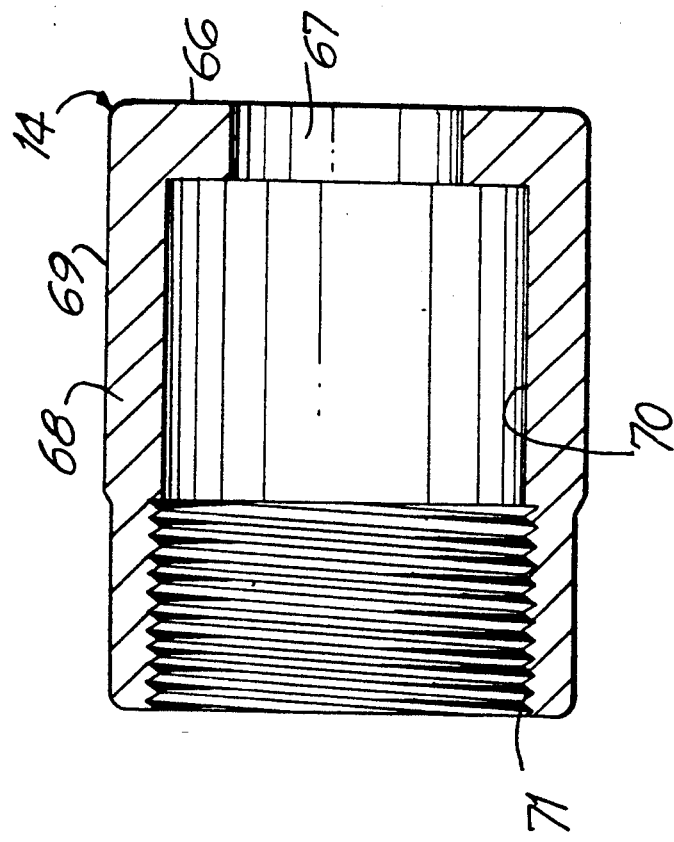
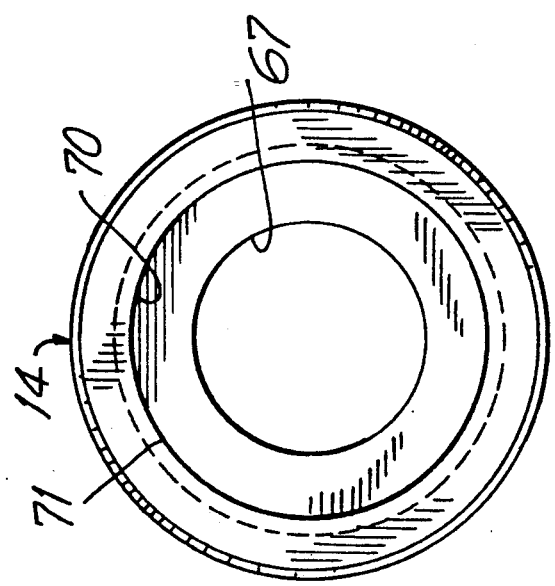
FIG. 11
FIG. 12

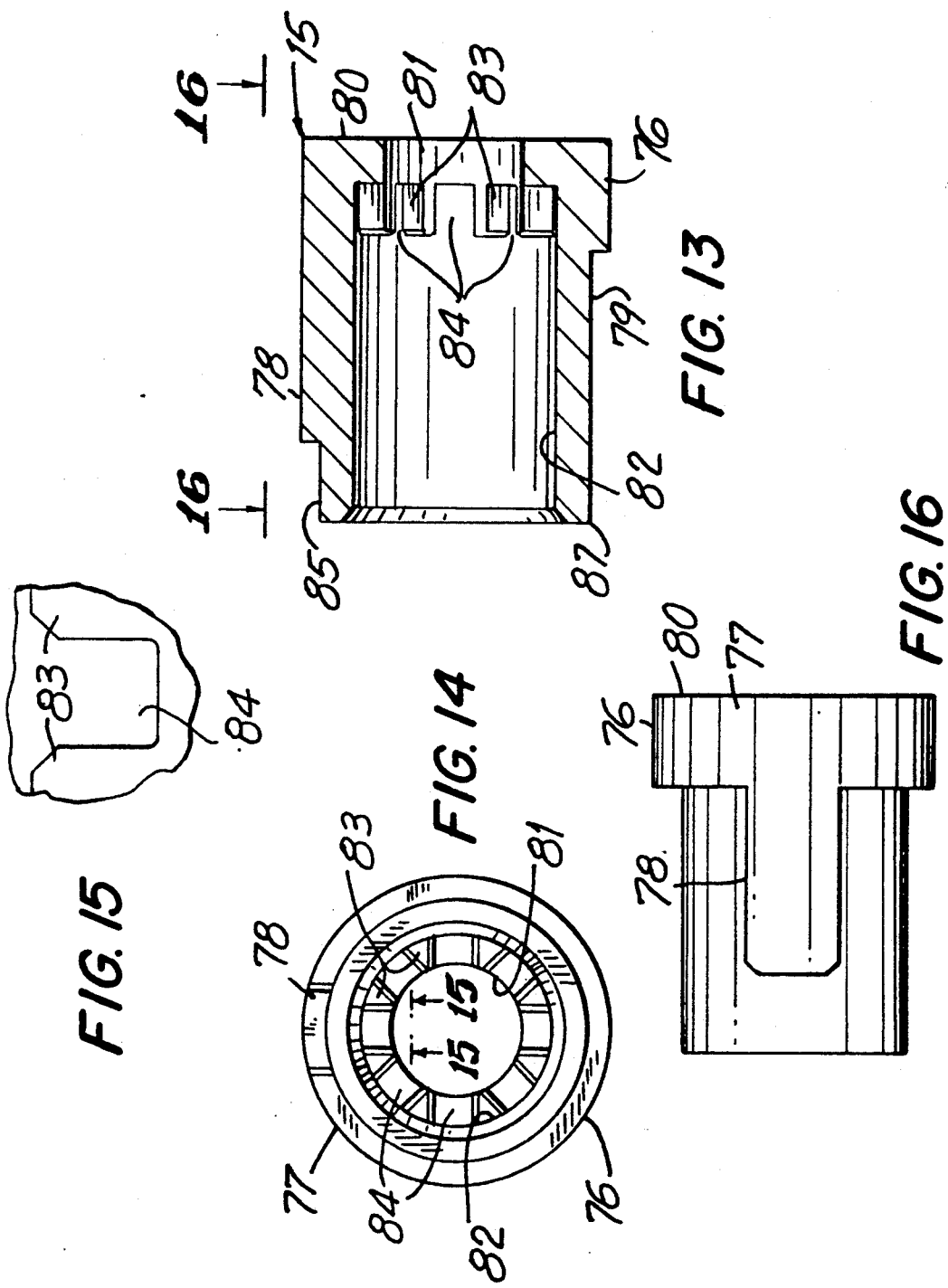

FIBER OPTIC PLUG CONNECTOR HAVING OPTICAL CENTER ADJUSTMENT MEANS

BACKGROUND OF THE INVENTION

This invention relates generally to the field of fiber optic signal transmission, and more particularly to an improved form of plug connector in which engagement with a corresponding jack or adapter is accomplished by means of a threaded sleeve. Devices of this type are well known in the art, and are referred to as type FC.

The conventional construction of this type of connector normally includes an axially aligned projection on the body element thereof which engages a corresponding recess in the jack, commonly called an adapter, so that when the plug is disconnected, it may be reconnected without loss of relative rotational orientation. This feature is of substantial importance, since the fiber optic core has been previously adjusted relative to the body of the ferrule for optimum centering of the ferrule outside diameter relative to the core of the fiber optic cable to which it is connected for signal transmission. Such devices, however, often do not have means for retaining the original adjustment prior to being fixed in position by cementitous or similar means.

The original adjustment is usually determined by testing (with a meter which measures light transmission) by trial and error, and can be a laborious task. This task is ameliorated if the core and surrounding cable can be first fixed in position relative to the plug element, and adjustment is obtained by means incorporated into the plug structure.

SUMMARY OF THE INVENTION

Briefly stated, the invention contemplates an improved fiber optic plug construction of the class described, in which the above-mentioned desiratum is incorporated. To this end, the plug construction incorporates a pair of relatively adjustable members in which one member includes a plurality of arcuately spaced slots, and the other member includes a pair of corresponding projections selectively engageable within said slots, resilient means permitting relative disengagement. A selectively engageable key element provides means for longitudinal displacement of one member relative to the other, followed by incremental rotation and reengagement of the projections in an adjacent pair of slots prior to retesting. Once the proper rotational adjustment has been obtained, removal of the tool element prevents accidental disengagement of the adjusted parts.

BRIEF DESCRIPTION OF THE DRAWINGS

In the drawings, to which reference will be made in the specification, similar reference characters have been employed to designate corresponding parts throughout the several views.

FIG. 11 is a longitudinal sectional view of a coupling nut.

FIG. 12 is an end elevational view as seen from the left-hand portion of FIG. 11.

FIG. 13 is a longitudinal sectional view of a key body.

FIG. 14 is an end elevational view thereof as seen from the left-hand portion of FIG. 13.

FIG. 15 is an enlarged sectional view as seen from the plane 15—15 in FIG. 14.

FIG. 16 is a side elevational view as seen from the plane 16—16 in FIG. 3.

DETAILED DESCRIPTION OF DISCLOSED EMBODIMENT

Figure 1:
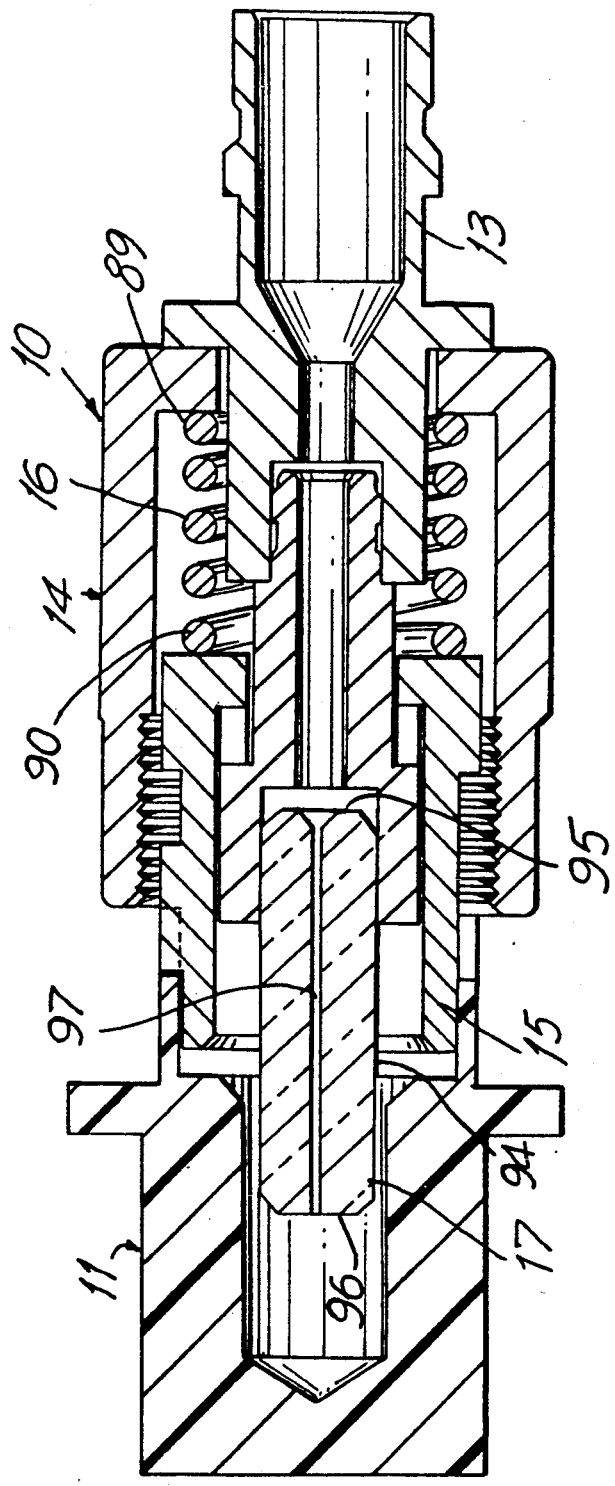
FIG. 1 is a longitudinal central sectional view of an embodiment of the invention.
Figure 3:
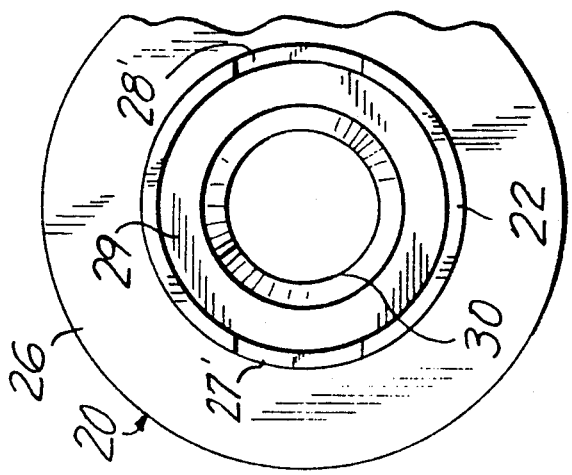
FIG. 3 is an end elevational view as seen from the right-hand portion of FIG. 2.
Figure 2:
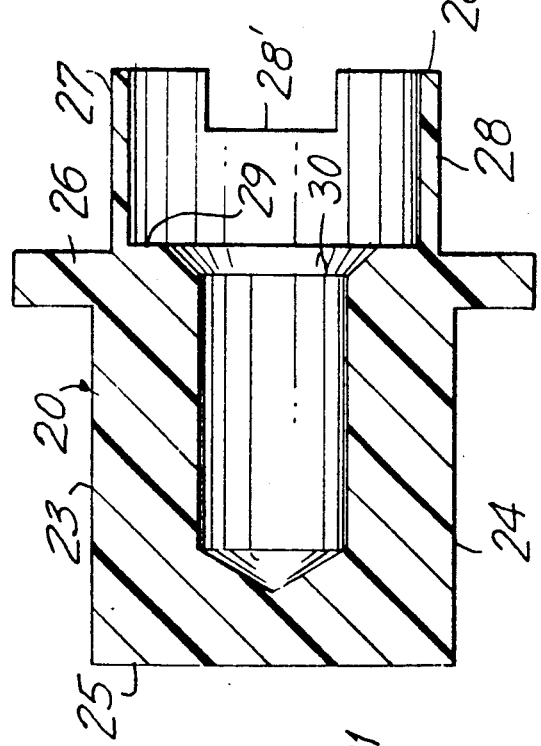
FIG. 2 is a longitudinal central sectional view of an adjusting tool forming a part of the embodiment.
Figure 4:
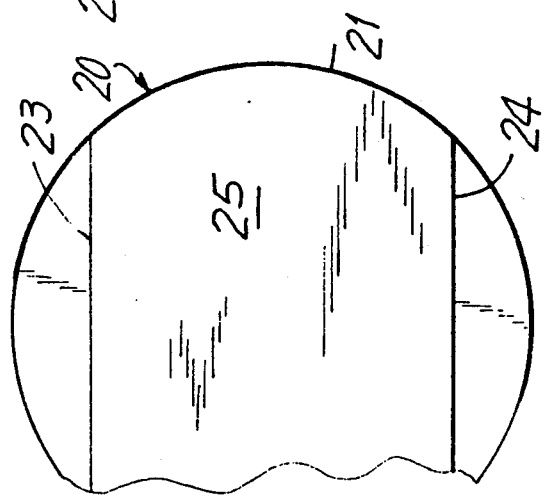
FIG. 4 is an end elevational view as seen from the left-hand portion of FIG. 2.
Figure 6:
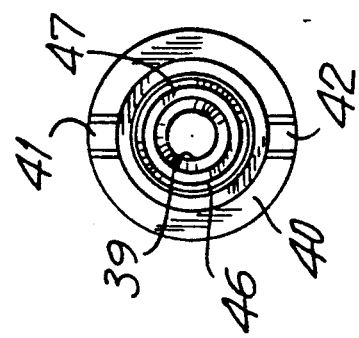
FIG. 6 is an end elevational view thereof as seen from the right-hand portion of FIG. 5.
Figure 8:
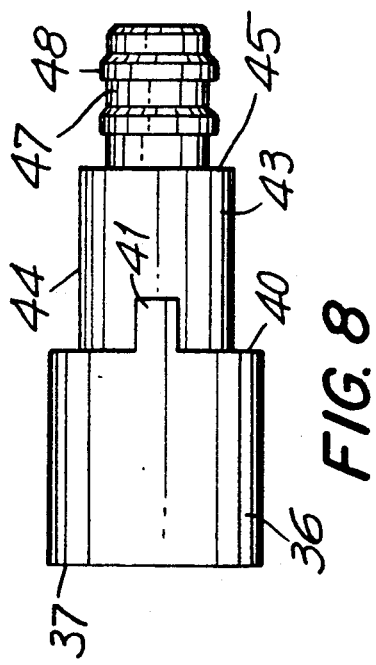
FIG. 8 is a top plan view thereof.
Figure 5:
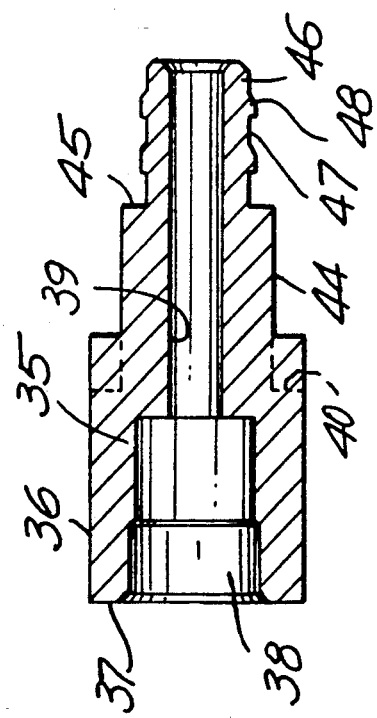
FIG. 5 is a longitudinal central sectional view of a front body element.
Figure 7:
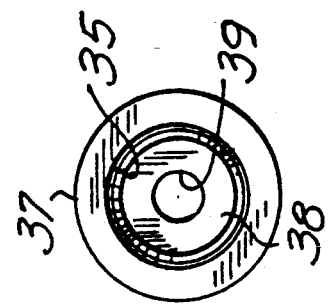
FIG. 7 is an end elevational view as seen from the left-hand portion of FIG. 5.
Figure 9:
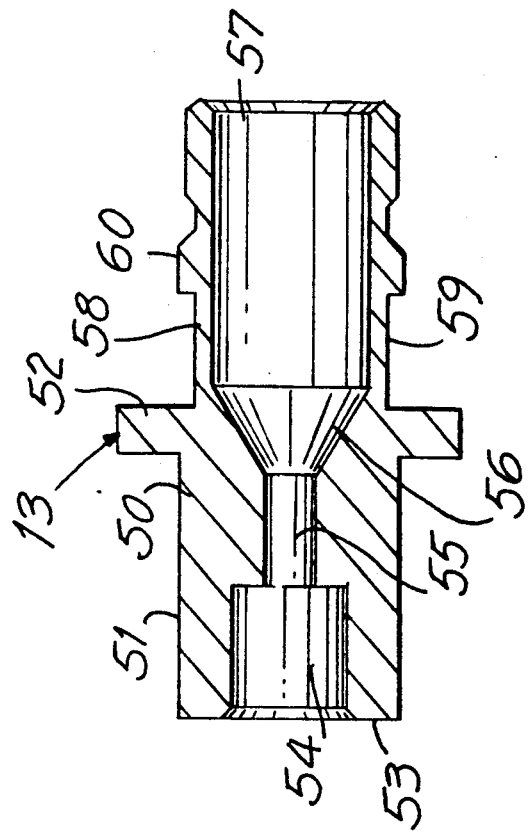
FIG. 9 is a longitudinal sectional view of a rear body element.
Figure 10:
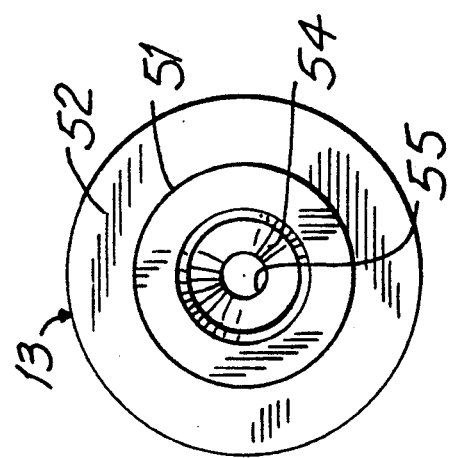
FIG. 10 is an end elevational view thereof as seen from the left-hand portion of FIG. 9.

Referring to FIG. 1 in the drawing, in accordance with the invention, the device, generally indicated by reference character 10, comprises broadly: a removable adjusting tool 11, a front body element 12, a rear body element 13, a coupling nut 14, a key body 15, a tension spring 16, and a ceramic ferrule 17.

The tool 11 is preferably formed as a nylon casting, and includes a manually-engaging body 20, bounded by first and second curved surfaces 27 and 28, first and second planar surfaces 23 and 24, and end surfaces 25. A radially-extending flange 26 is positioned at the inner end of the body 20 and provides for finger stop means when in use. A pair of slots 27 and 28 extends inwardly from surface 28A and provides clearance for an elongated projection 78 (FIG. 16). Extending inwardly from the surface 29 is a chamfered bore 30 which provides clearance for the ferrule 17.

The front body element 12 is preferably formed as a high precision zinc casting, and includes a larger inner end portion 35 bounded by an outer cylindrical surface 36 and an end wall 37 leading to a bore 38 which also accommodates the ferrule 17. A bore 39 accommodates the buffered fiber layer (not shown) of an engaged cable. Extending from an opposed surface 40 are first and second alignment lugs 41 and 42. A smaller outer end 43 is bounded by a cylindrical surface 44 and an end surface 45 from which an extension 46 engaging the rear body element projects. The outer surface 47 of the extension is provided with ribs 48 to facilitate a frictional fit therewith.

The rear body element 13 is also formed as a zinc die-casting, and includes a main body member 50 having an outer cylindrical surface 51 and a radially-extending flange 52. An end wall 53 surrounds a bore 54, which engages the extension 46. The bore 54 leads to a bore 55, a conical bore 56, and a larger counter bore 57 into which parts of the fiber optic cable project. The counter bore, 57, is disposed within a rearward extension 58 bounded by an outer surface 59 having a rib 60 to enable frictional engagement with a flexible strain relief member (not shown) of known type, and thus retain it.

The coupling nut 14, again, a die casting, is generally conventional, and includes an end wall 66 having a central bore 67. A cylindrical side wall 68 includes a knurled outer surface 69, and a central bore 70 having a threaded outer end 71 which permits engagement with a conventional adapter (not shown).

The key body 15, again, a die casting, includes a cylindrical side wall 76 bounded by an outer surface 77. An elongated projection 78 is best seen in FIG. 16 in the drawing. An end wall 80 leads to a centrally disposed bore 81, in turn communicating with a larger bore 82. A plurality of integrally molded slot-forming members 83 define a plurality of slots 84 therebetween, most conveniently, eight in number. Rabbetted portions 85 and 87 are adapted to engage projections 27 and 28.

The spring 16 is generally conventional, and includes a first end 89 which engages the end wall 80, and a second end 90, which engages the end wall 66.

The ferrule 17 is preferably of entirely ceramic construction of a type known in the art. It is bounded by an outer surface 94 extending between first and second end surfaces 95 and 96. A centrally disposed bore 97 mounts an optical fiber (not shown).

It will be noted that the device is completely assembled and maintained by virtue of the frictional engagement between the front and rear body elements, as best appreciated from a consideration of FIG. 1. When a fiber optic cable is to be terminated, the jacket and strength members are removed to expose the buffer and fiber, so that the cable may be inserted from the right-hand portion of FIG. 1 in usual manner. In this condition, the plug may be readily engaged with an adapter, securing the same in position by threaded engagement of the coupling nut. When a similar connection is made on the opposite side of the adaptor, light transmission may be measured in known manner using a meter to determine the degree of light transmission. The rotational alignment of the cable will usually not be the correct one, and adjustment is made by disengaging the coupling nut and moving the tool rightwardly, as seen in FIG. 1, which serves to disengage the projections 41 and 42 on the front body from the engaged slots 84 in the key body 15. This longitudinal movement will be limited by contact of the key body with the rear body element, at which point the tool is rotated 45 degrees and released to permit a new pair of slots 84 to be engaged. The tool is then removed, and the device recoupled with the adaptor following which another light transmission test is made. The process is continued until optimum light transmission is obtained, at which point further adjustment is unnecessary. The removal of the tool will then prevent accidental loss of the adjustment which is maintained by the spring 16, since there is no other exposed means for longitudinally shifting the projections 41 on the front body from the slots 84.

I wish it to be understood that I do not consider the invention to be limited to the precise details of structure shown and set forth in the specification, for obvious modifications will occur to those skilled in the art to which the invention pertains.

I claim:

1. A fiber optic plug connector having means for rotationally adjusting a terminated optical fiber about its own axis with respect to the axis of the connector, said connector comprising: a front body element, a rear body element attached to said front body element in coaxial relation, a threaded coupling nut surrounding and engaging said interconnected front and rear body elements, and providing means for securing said plug connector to an adapter; said front body element having at least one rearwardly extending projection; said rear body element having means for engaging a fiber optic cable; said front body element having a bore and a fiber supporting ferrule engaged within said bore; a key body surrounding said front body element and having a plurality of slots selectively engaging said rearwardly extending projections on said front body element; resilient means interconnecting said key body and said coupling nut serving to maintain engagement of said projections within said slots; said key body having a forwardly-extending key for engaging said adapter in predetermined relative rotational position; and an adjusting tool selectively engaging said key body to move said key body axially against said resilient means and rotate the same to selectively permit engagement of said slots with said rearwardly-extending projections; whereby when said plug connector is engaged within said adapter, the rotational position of said ferrule is established relative to the ferrule of a mating plug connector.

2. A plug connector in accordance with claim 1 in which said resilient means comprises a coil spring.

* * * * *